FIG. 1

REINALD S. NIELSEN
INVENTOR.

Sept. 14, 1965    R. S. NIELSEN    3,206,743
BINARY UNIVERSAL CODE KEYER
Original Filed Aug. 8, 1958    7 Sheets-Sheet 3

REINALD S. NIELSEN
INVENTOR.

BY *Delbert O. Warner*

FIG. 6

REINALD S. NIELSEN
INVENTOR.

BY Delbert B. Warner

FIG.7

United States Patent Office 3,206,743
Patented Sept. 14, 1965

3,206,743
BINARY UNIVERSAL CODE KEYER
Reinald S. Nielsen, Carlisle, Mass., assignor to Link Division of General Precision, Inc., Binghamton, N.Y., a corporation of Delaware
Continuation of application Ser. No. 754,041, Aug. 8, 1958. This application Oct. 9, 1962, Ser. No. 229,782
10 Claims. (Cl. 340—365)

This invention relates to transmission signal keyers and more particularly to a device which automatically sequences a series of Morse code-like signals into a signal transmission system by the use of bistable switching circuits. The application is a continuation of my copending application Serial No. 754,401, filed August 8, 1958.

In a grounded aviation trainer or simulator, apparatus is provided whereby simulated signals, representing radio stations, are presented to the student in the trainer to simulate actual flying conditions. These signals are presented in the same manner that the pilot of a real aircraft would receive radio signals if the plane were actually flying the selected course relative to actual radio stations. Such simulated signals may be used to duplicate the A-N signals of a low frequency radio range, the visual and aural signals of an omini-directional range, or any other signals transmitted in conjunction with a homing or navigation system, etc.

These signals are usually transmitted in a prearranged message pattern to identify a certain radio station. The station identification signals are usually of a Morse code-like nature (dot, dash, and space intervals). Each station is assigned its own particular set of station identification letters, or call letters, which are transmitted and received by the pilot or student flying the real aircraft or the simulator.

In the past, the sequence of dots and dashes, which composed the station identification signals have been produced by code type devices which control oscillators used to produce the signal, relay operated devices set in a prearranged sequence or else by a series of cams which are placed on a rotating shaft and arranged to key a circuit when the cam rise trips the cam follower at a predetermined position.

The disadvantages inherent in these semi-mechanical devices are obvious when it is considered that the code tapes often tear or the code tape drive system breaks down, that relays often go out of adjustment, that the cam operated arrangement is difficult to set up into a prearranged signal sequence, and that a change from one prearranged signal sequence to another entails considerable effort.

The present invention overcomes these disadvantages by providing an all-electronic signal keyer, which utilizes bistable switching circuits to produce accurately time-proportioned Morse code elements in any desired code sequence. A series of multi-position switches are provided and the bistable circuits are switched "on" and "off" in accordance with the settings of the switches. The setting of an individual switch determines whether the bistable circuits will produce a dot, a dash, an inter-letter space, or will stop the signal sequence. The switches are used to set up any signal sequence and changes in the sequence can be made rapidly with a minimum of effort.

Once the system is set into operation, the signal keyer will produce the desired sequence of code elements until stopped. Using the present system, it is also possible to provide means for rapidly changing the time interval in which the station identification letter sequence is transmitted (message speed) and still maintain a fixed ratio of time duration between the dot and dash elements.

It is therefore an object of this invention to provide an all-electronic signal keyer which is capable of producing a desired sequence of Morse code-like signals.

Another object of this invention is to provide a signal keyer that does not employ mechanical or electro-mechanical moving parts in the production of a signal sequence.

A further object of this invention is to produce a signal keyer which utilizes bistable switching circuits in the production of the letter elements.

Yet another object of this invention is to provide a novel signal keyer which utilizes bistable switching circuits to preserve the regiment of element time lengths regardless of the rate at which the signal keyer is operating.

Still a further object of this invention is to provide a novel signal keyer wherein the code sequence is created by the setting of a series of switches.

Other objects and advantages of this invention will be more apparent upon referring to the accompanying specification and drawings, in which.

As previously stated, radio stations are usually identified by the transmission of a series of Morse code letters, usually three in number. Each letter is composed of a series of elements, an element being a dot, a dash, or an inter-element space. In the composition of an element, the ratio of dash to dot length is ideally preserved at 3 to 1, i.e., a dash occupies three times the time interval of a dot. Between each of the elements of the letter a space equivalent to one dot length is maintained. The amount of time allotted for the space between two letters, the inter-letter space, is equal to the period of a dash, which in turn is equal to the period of three dots. The time interval after the call letter message can be of any duration and is determined by the particular radio facility being used or being simulated.

In the present system, a plurality of multi-position switches represent, as set-up, a sequence of dots, dashes and inter-letter spaces. Provision is also made whereby any one of the switches may terminate the message sequence. The switches are sequentially interrogated by a counter circuit which is set into operation when a start pulse is applied to the system. As each switch is interrogated, it sets into operation circuitry, according to the switch position selected, which produces a signal representative of a dot, dash, inter-letter space or a signal to terminate the message sequence.

The circuitry controlled by the series of switches comprises logical "and," "not and," and "or" elements plus elements of the bistable, flip-flop type, which have two stable states. For the purposes of this application, and as is well known in the art, the two stable states can be considered as an "on" or 1 output condition and an "off" or 0 output condition. When the bistable element is in the "on" state a positive output voltage, representative of a binary 1, is produced. In the "off" state, a less positive voltage, or binary 0, is present at the output of the bistable element. It should also be noted that, for present discussion, a positive voltage pulse is assumed necessary to change the state of a bistable element from an "on" to "off" condition, or vice-versa, and that a negative voltage pulse applied to the bistable element will not accomplish this result. The pulse used to change the bistable element from the "off" to "on" state (0 to 1) is called a "set" pulse. The pulse used to change the bistable element state from "on" to "off" (1 to 0) is called a "reset" pulse.

Conventional logical "and" and "not and" circuits are furnished with two, or more, input signals. In the instance of a two input "and" circuit, the presence of signals at one input and at the second input is required to achieve a signal at the output of the "and" circuit. Similarly, a two input "not and" circuit requires the presence of a signal at one input and no signal at the second input to achieve a signal at the output of the "not and" circuit. Logical "or" circuits have two, or more, inputs, and produce an output signal when a signal is present at any input. For convenience in the ensuing discussion, the inputs to "and" and "not and" circuits will be labeled as $a$ and $b$ with $b$ the "not" input of the "not and" circuits.

When the code keyer circuitry is in operation, as represented by the state of a "control" flip-flop, a signal representative of the selected dot or dash is fed to a gate circuit and acts as a gating signal to allow the tone signal generated by a continuously operating audio frequency signal generator to reach the output circuit of the system. The duration of the gated tone is selected by the switches, since they control the period that the code keyer circuitry produces the gating signal and also the period during which the code generator circuitry does not produce a gating signal. The "no gating signal" or "silence" intervals are representative of the inter-element and inter-letter spaces or the end of message, and do not allow the tone signal to be present at the output circuit of the system.

The signal keyer system is synchronized by means of synchronizing or timing pulses, which are produced by a clock pulse generator. The clock pulses control the fundamental dot element time duration. Variation of the frequency of the clock pulses varies the rate of operation of the signal keyer system, but due to the use of the binary circuitry the regimen of a dash and an inter-letter space both being equal to the period of three dots is always preserved.

Figure 1:
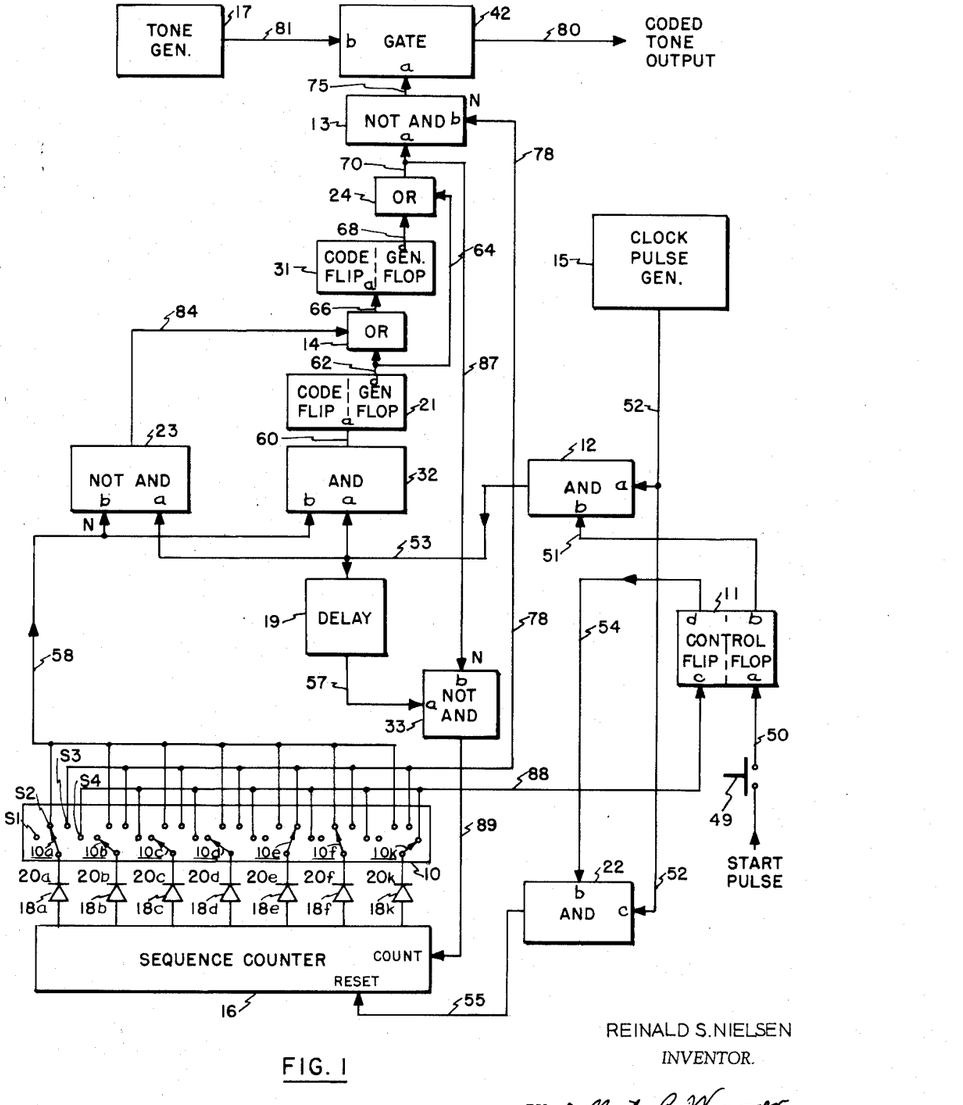
FIG. 1 is a block diagram of the signal keyer.
Figure 2:
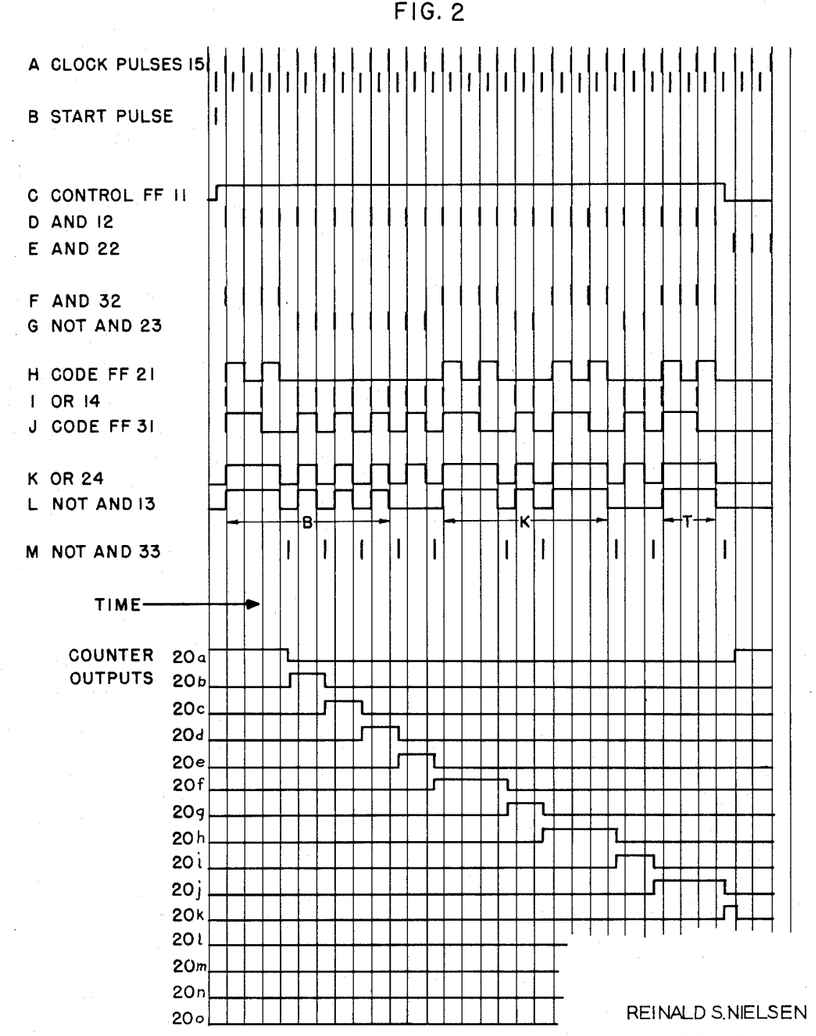
FIG. 2 is a graphical representation of the signals present at various points in the system.

Referring to FIGURES 1 and 2, the operation of the system is described as follows. In FIG. 1, the rotating arms of a series of multiposition switches, 10a 10b, 10c, 10d, 10e, 10f . . . etc., which comprise switching unit 10, are connected through respective diodes 18a, 18b, 18c, 18d, 18e, 18f . . . etc., to the outputs 20a, 20b, 20c, 20d, 20e, 20f . . . etc. of a sequence counter 16. Each of these switches 10a–10f . . . etc. is a four position switch having stationary contacts, reading in a clockwise direction, S1, S2, S3 and S4. On each of these switches the contact position S1 represents the dot element, S2 the dash element, S3 the inter-letter space element, and S4 the stop signal element.

There are as many switches 10a . . . etc. as there are counter outputs 20a . . . etc. of the sequence counter 16, each of the switches being connected to an output line of the counter 16, through a respective diode 18a . . . etc. In the embodiment of the invention shown, 16 switches are used to correspond to a "Modulo 16 Counter," which is described in detail. The invention can be extended by utilizing counters of higher moduli.

In order to describe the signal keyer system an illustrative example is used, wherein the system is set up to generate the letters B, K, T. This is represented in the switching unit 10 by setting the switch 10a to the S2 dash position and setting the switches 10b, 10c and 10d to the S, or dot position to represent the letter B, which consists of the sequence of a dash and three dots. Switch 10e is set to the S3 inter-letter space position to provide a space between the letter B and the first dash element of the letter K which is represented by switch 10f being set to the S2 position. For the sake of simplicity, the remainder of the switching sequence arrangement for generating the letters is not shown in FIGURE 1, but the corresponding waveforms are given in FIGURE 2. Switch 10k is set to the S4 stop position to end the sequence of message transmission.

Figure 5:
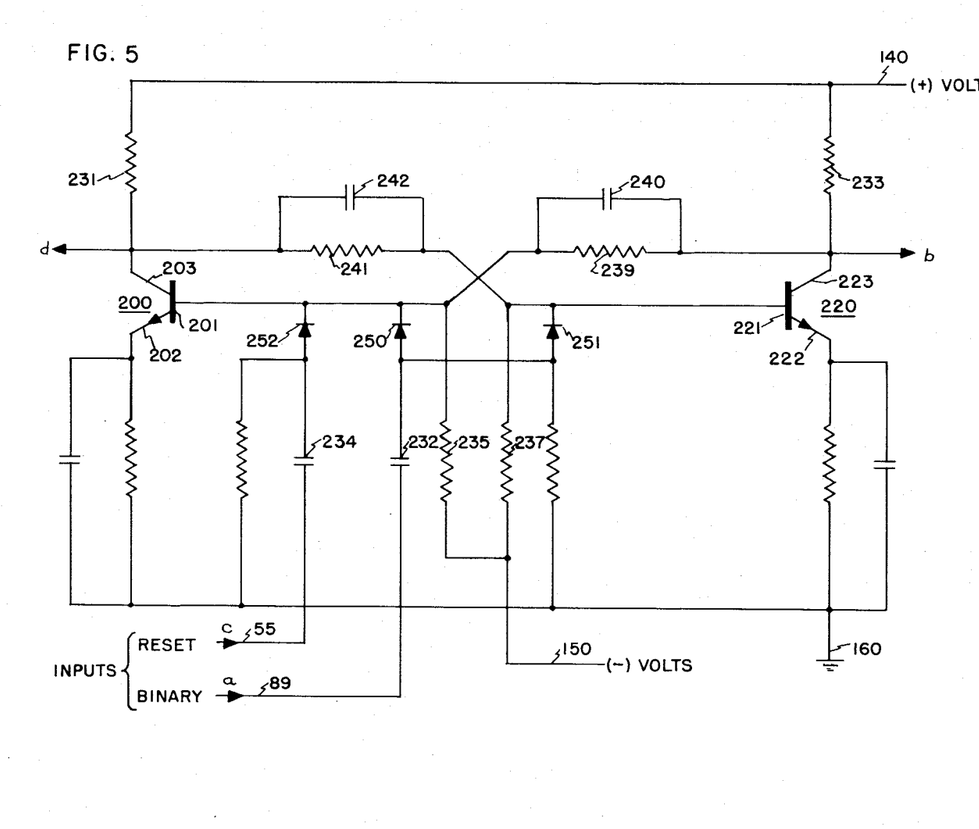
FIG. 5 illustrates a basic transistor bistable (flip-flop) circuit.

To set the code keyer into operation, a start pulse, shown at line B of FIGURE 2, is applied to input $a$ of the control flip-flop 11 over line 50 when switch 49 is closed. Throughout this specification all flip-flop circuits will be designated with inputs $a$ and $c$ and with respective outputs $b$ and $d$. Flip-flop circuit 11 is of the conventional type which has two stable states. In the present invention for the purposes of compactness and better switching, transistor flip-flop circuits are used. A typical flip-flop circuit is shown in FIGURE 5, and is described later. The start pulse applied to input $a$ of control flip-flop 11 "sets" the circuit into one of its stable states of operation. In this instance output $b$ of the flip-flop circuit produces a positive voltage output, and output $d$ a less positive output voltage. The output $b$ of flip-flop 11 is shown on line C of FIGURE 2. Flip-flop 11 remains in this state, i.e., the left-hand section conducting and producing a 0 at output $d$ and the right-hand circuit non-conducting and producing a 1 at output $b$.

The output of clock pulse generator 15, shown on line A of FIG. 2, consists of a series of positive pulses occurring at regularly timed intervals. The clock generator 15 may be any suitable type, for example, a continuously operating multivibrator circuit. The clock pulse generator 15 utilized in this invention is well-known in the art and its details form no part of the present invention. The clock pulses are applied over line 52 to input $a$ of "and" circuits 12 and 22.

The 1 output from $b$ of control flip-flop 11 is applied over line 51 to input $b$ of "and" circuit 12. The other input, $a$, of "and" circuit 12 receives clock pulses from the clock pulse generator 15 over line 52. The "and" circuit 12 is of the conventional type which produces a signal on line 53 upon the simultaneous occurrence of signals at inputs $a$ and $b$, from input lines 51 and 52.

The 0 from the $d$ output of the control flip-flop 11, is applied over line 54 to input $b$ of a second "and" circuit 22. Input $a$ of "and" circuit 22 receives clock pulses from clock pulse generator 15 over line 52. The simultaneous occurrence of a positive pulse and a 0 at the inputs of "and" circuit 22 keeps the output of the circuit at line 55 in a 0 condition. The output of "and" circuit 22 is shown on line E of FIGURE 2 where it is seen that positive pulses appear at the output line 55 only when the $d$ output of control flip-flop 11 produces a 1 output. This arrangement keeps the sequence counter 16 from being reset to another operating mode by keeping pulses off line 55, the sequence counter reset line, while the signal keyer is producing a message.

In order to generate a dash element, as previously set up on switch 10a, assume that the sequence counter 16 is producing a positive voltage at counter output 20a and is thereby interrogating switch 10a. Counter output 20a is shown in FIG. 2 as are the other counter outputs 20b through 20k. The positive voltage present at contact S2 of switch 10a is applied over line 58 to input $b$ of "and" circuit 32. "And" circuit 32 receives its $a$ input over line 53 from "and" circuit 12, which passes the clock pulses from clock pulse generator 15 during message generation. The output of "and" circuit 32, which is shown on line F of FIGURE 2, is applied over line 60 to input $a$ of a code generator flip-flop 21.

The "and" gate 32 is made operative by the interrogating voltage applied from the counter output 20a via switch 10a, over line 58 for a period sufficient to allow four clock pulses to appear at the output 60 of "and" circuit 32. Code-generator flip-flop 21 is similar to control flip-flop 11 except that there is only one input to which the "set" and "reset" pulses can be applied. The pulses at the input *a* of flip-flop 21 switch code generator flip-flop 21 from one stable state to another.

The first clock pulse applied to input *a* of code generator flip-flop 21 "sets" the flip-flop. Consecutive clock pulses appearing at input *a* "reset" and "set" flip-flop 21 with a positive output voltage oppearing at *b* each time the flip-flop is "set." Line H of FIGURE 2 shows the sequence of voltage levels at output *d* of flip-flop 21 as the four pulses, illustrated on line F of FIG. 2, are applied at input *a*.

The output voltage, shown on line H, is applied to one input of a first "or" circuit 14 over line 62 and also to an input of a second "or" circuit 24 over line 64. Application of the output voltage from code generator flip-flop 21 to "or" circuit 14 over line 62 results in a derived trigger at input *a* of a second code generator flip-flop 31. The derived trigger is conveyed over line 66 to input *a* of flip-flop 31 and is illustrated on line I of FIG. 2. Successive input pulses to flip-flop 31 input *a* cause the code generator flip-flop 31 to produce output voltages at *d* as illustrated on line J of FIG. 2. The outputs of the two code generator flip-flops 21 and 31 are transmitted to the second "or" circuit 24 to produce an output voltage on line 70 shown at K of FIGURE 2. This waveform is conveyed over line 70 to input *a* of "not and" circuit 13 and over line 87 to input *b* of circuit 33.

The waveform present on line 70 is a combination of the outputs of code generator flip-flops 21 and 31 brought about in the logical "or" circuit 24. One may readily recognize that the time duration of a dash element of the waveform on line K is precisely three times the period between clock pulses of line A. Thus, the waveform of line K corresponds to a Morse code dash or a Morse code dot of time duration equal to an odd multiple of the clock pulse period.

The waveform at the output of "not and" circuit 13 is applied to gate circuit 42 over a line 75. The *b* input to gate circuit 42 is from a continuously operating signal generator 17 which generates the signal producing the tone output. The tone signal may be used to set either an aural or a visual receiving device. When a positive voltage is present on line 75 it opens gate 42 so that the output of the tone signal generator 17 is present at the coded tone output line 80. Gate circuit 42 may be of any conventional design and would be generally similar to "and" circuits 12 and 22.

As mentioned above, the output of "or" circuit 24 via line 87 is applied to the *b* input of circuit 33. The effect of this signal (shown on line K of FIG. 2) is to block the delayed clock pulses appearing at input *a* of circuit 33 from entering sequence counter 16 via line 89. The clock pulses are delayed by convention delay circuit 19 to avoid difficulties that might occur if sequence counter 16 was changed with a dash, or dot, code element is being generated. The output of circuit 33, on line 89, is illustrated on line M in FIG. 2.

In this invention, the dot length waveform is generated by the same circuitry creating the dash waveform by causing the clock pulses from clock pulse generator 15 to be applied directly to code generator flip-flop 31 by means of another "not and" circuit 23 and "or" circuit 14. In this case switches 10*b*, 10*c*, and 10*d* are each set to the S1 position in order to create a dot waveform. The outputs 20*b*, 20*c*, 20*d*, etc. of sequence counter 16, interrogating each of switches 10*b*, 10*c* and 10*d* terminate at an unconnected contact S1. Therefore, there is no 1 signal applied to the *b* input of "not and" circuit 23 as there was during the generation of the dash element. Clock pulses appearing on line 53, therefore, pass through and "not and" circuit 23 and appear over line 84 at an input of "or" circuit 14. Since there is no 1 input on line 58 to "and" circuit 32 input *b*, there will be no clock pulses fed to code generator flip-flop 21, and therefore no output signal from the code generator flip-flop 21 as shown on line H.

A series of pulses are present at input *a* of flip-flop 31 during the time when flip-flop 21 is not active. These pulses originate at the output of "or" circuit 14 on line 66. This is shown at line I of FIGURE 2 following the first four pulse positions which are provided by flip-flop 21 acting on "or" 14. These pulses will "set" and "reset" code generator flip-flop 31 to produce an output at *d* (line 68) as shown on line J of FIG. 2 (following the dash pattern). This output is applied, via line 68, to "or" circuit 24, and appears at output line 70 as shown on line K of FIG. 2. Feeding through "not and" circuit 13, the signal appears on line 75 of FIG. 1 to enable gate 42, as in the case of dash generation described above.

A basic feature of the invention has been implicit in the description of dash and dot generation. Namely, the odd-multiple element time lengths have been adapted to the binary number system.

For correctly proportioned Morse code generation, various code elements are conventionally defined in multiples of a dot element time length. Thus, a dash is three dot lengths, space interval between dots and dashes within a letter is one dot length, spaced interval between letters is three dot lengths, etc. To accommodate the odd multiples (one, three, five, etc.) to a binary counting system, it is convenient to consider the fundamental dot, dash, and silence interval to have a dot length silence interval appended.

Accepting this convention, it becomes possible to create a dot period by means of two clock pulses fed to a flip-flop stage; considering the flip-flop to be initially in the silence condition, the first pulse will turn a tone "ON" and the second pulse will turn it "OFF." Obviously, a third pulse cannot turn the tone "ON" again until one clock pulse period elapses. A flip-flop fed a continuous series of clock pulses would produce a continuous series of dots alternating with dot length silences.

To create a dash that is three dot lengths equivalently, one may feed clock pulses to a two stage binary counter (cascaded flip-flops). Refer to waveforms labeled Code FF 21 (line H) and Code FF 31 (line J) of FIG. 2; the pulses shown on line F are to be considered the input to Code FF 21. The first pulse to FF 21 turns it "ON" and the second pulse turns it "OFF", while the carry from FF 21 turns FF 31 "ON." At the third pulse, FF 21 turns "ON" again and on the fourth pulse it turns "OFF," creating a carry that turns FF 31 "OFF." Inspection of FIG. 2, lines H and J, shows that Code generator 21 and/or Code generator 31 are "ON" during the time interval between the first and fourth clock pulse, and after the fourth pulse, both flip-flops are "OFF." By summing the outputs of FF 21 and FF 31 by means of an "OR" circuit, the "OR" circuit output can be used to turn a tone "ON" during the interval included between the first and fourth clock pulses.

Obviously, a fifth clock pulse cannot start a repetition of the above operation until the elapse of one clock pulse period after the fourth pulse. An "OR" circuit responding to the outputs of two cascaded flip-flops fed a continuous series of clock pulses, would produce a continuous series of dashes alternating with dot length silences.

Longer silence intervals can be created by modifying the dot generator function. Since both the dot and the dash code elements are followed by dot length silence intervals, a three dot length silence can be achieved by creating a dot but preventing it from switching "ON" the tone. Thus, the dot length silence interval following a dot or dash element will be followed by a second dot length interval, during which the dot tone is suppressed, and a third dot length interval corresponding so that normally following a dot element. By this means, it is possible to create silence intervals corresponding to any odd multiple of the fundamental dot time length.

In FIG. 1, the inter-letter space for the B and K letters of the suggested exemplary message, is produced by setting switch 10e to the S3 position. When switch 10e is interrogated by output 20e of sequence counter 16 a voltage is applied over line 78 directly to the *b* input of "not and" circuit 13. In the meantime, there is a 0 signal at the *b* input of "not and" circuit 23, since line 58 receives no signal for the counter 16, and a dot element is produced on line 70 in the same manner as previously described. When these two signals, from line 70 and from line 78, appear at the inputs *a* and *b* of "not and" circuit 13, there is a 0 output from the circuit on line 75, as shown on line L, in the space between the B and K. When there is no positive voltage on line 75, gate 42 is disabled and there is no tone present on output line 80.

To stop the sequence, switch 10k is set to the stop position S4. The positive pulse appearing at the output 20b now passes through the switch and is conveyed over line 88 to the *c* input of control flip-flop 11. Receipt of this pulse "resets" flip-flop 11 and causes a 0 signal to appear at the *b* output on line 51. This 0 signal disables "and" circuit 12 via input *b*, and no clock pulses reach the code generator flip-flops 21 and 31. Output *d* of control flip-flop 11 now produces a 1 signal which is coupled over line 54 to input *b* of "and" circuit 22. Input *a* of "and" circuit 22 receives clock pulses from the clock pulse generator 15. Under these conditions clock pulses appear on reset line 55 and reset the counter 16 so that an output appears at 20a. If none of the switches of switch unit 10 are set to the S4 stop position, the counter 16 will continuously operate. To accomplish this, any unused switches are set to the S3 inter-letter space position.

It is also possible to periodically generate a message at fixed instants of time with the code-keyer. For example, suppose it is desired to transmit a message (three or four letters), which has a time duration of only a fraction of a minute, at one minute intervals. This may be accomplished by setting the switch immediately following the last letter element to the S4 stop position. After the generation of the last letter the system stops and is restarted only upon application of a start pulse over line 50. By connecting a suitable start pulse generator to line 50 which generates pulses at the desired intervals, here equal to one minute, the code-keyer generates a message at one minute intervals with a period of silence following each message. The period of silence may be used to convey other types of information to the pilot or student, as for example, weather A–N signals, the omni-range V signal, or like information.

Referring to FIGS. 2–7, the circuitry of the various flip-flops, "and" circuits, "or" circuits and "not and" circuits is now described. In these figures, similar reference characters are used to designate similar elements, circuits, and points of signal occurrence denoted, in FIG. 1.

Figure 6:
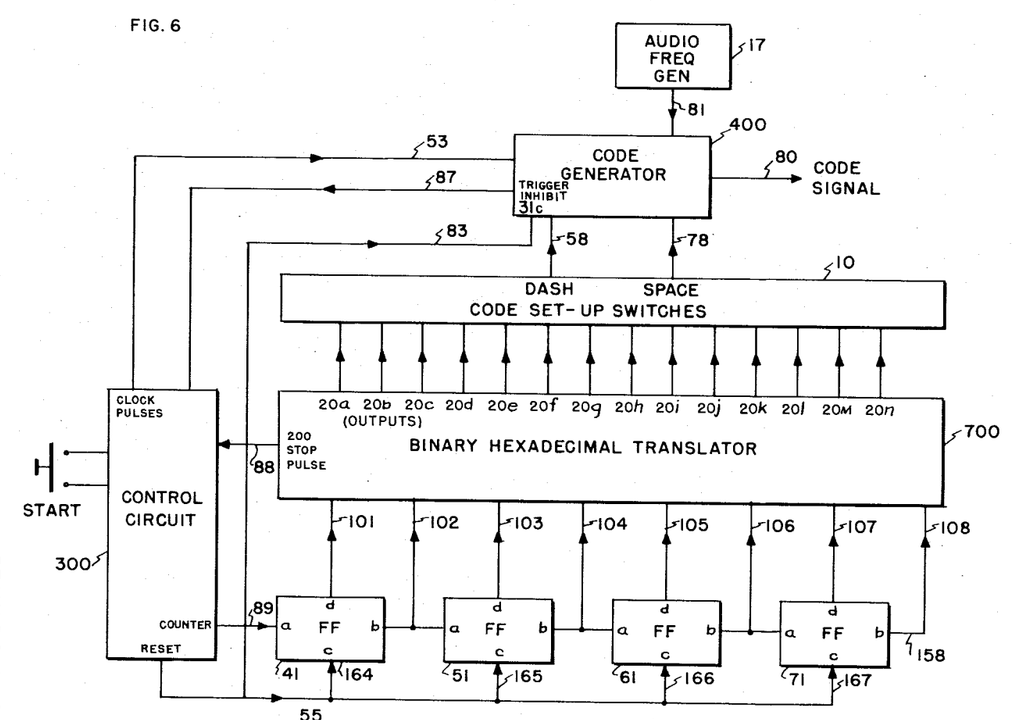
FIG. 6 illustrates a partial block diagram of the system.
Figure 7:
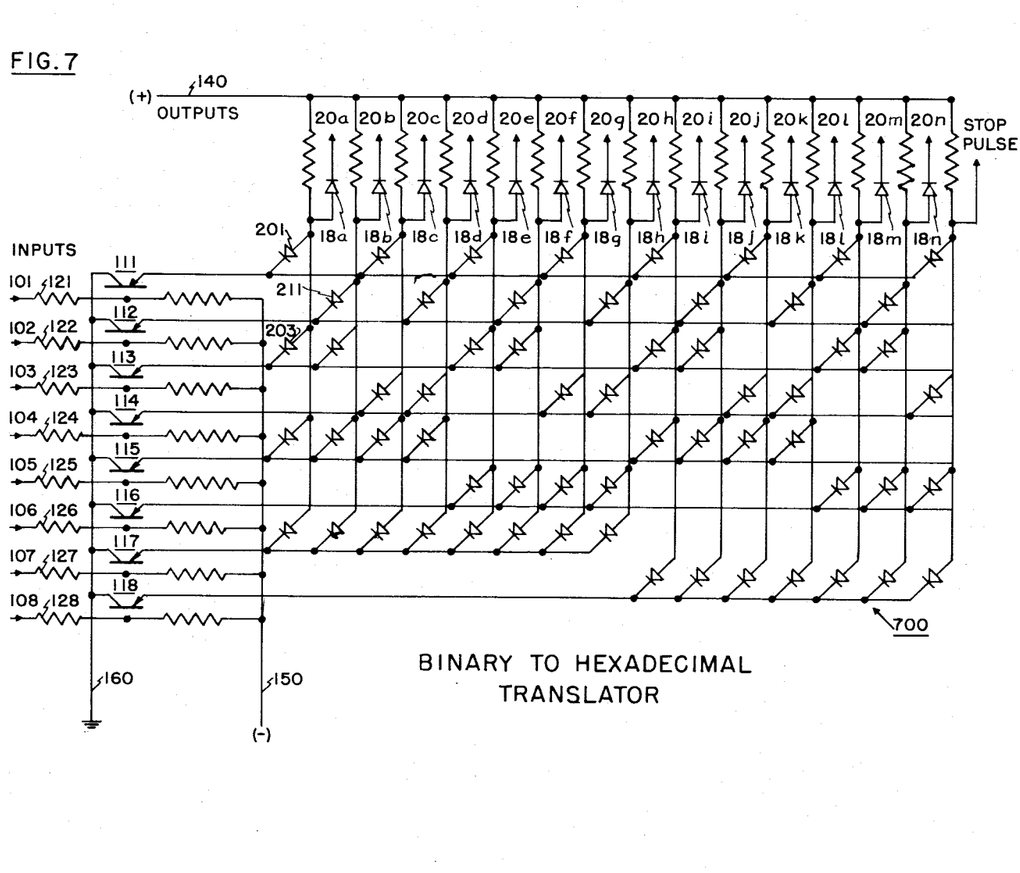
FIG. 7 is a schematic representation of an exemplary binary to hexadecimal translator.

FIGURES 5, 6 and 7 illustrate circuitry for the sequence counter 16 of FIG. 1. FIGURE 5 illustrates a common flip-flop circuit employing transistors as active elements. Circuit descriptions and design data for such a circuit may be found in "Handbook of Semiconductor Electronics," Lloyd P. Hunter, Ed.: McGraw-Hill, New York 1956; Section 15.10, p. 15–38.

In FIGURE 6 is shown, in block form, the connection of four flip-flops in cascade to form a $2^4$ binary counter chain. Outputs from the four flip-flops, designated as 41, 51, 61, and 71 in FIG. 6, are carried via output lines 101 through 108 to the binary-hexadecimal translator 700. The binary-hexadecimal translator converts the input voltages, at terminals 101–108 in FIGURE 7, corresponding to a binary number to an equivalent hexadecimal output appearing in numerical sequence at outputs 20a through 20n and the Stop Pulse terminal. Again, the circuit of the translator is well known, forms no part of the invention, and is discussed in the volume "High Speed Computing Devices," Engineering Research Assoc. Staff: McGraw-Hill, New York 1950; Section 4-3-4, p. 40. One departure from the reference is the use of buffer diodes, 18a through 18n of FIG. 7, to minimize loading effects on the translator diode matrix; this standard technique is also described in "High Speed Computing Devices."

FIGURE 6 is the block diagram of a signal keyer that may be set to any three-letter Morse code combination. Since the greatest number of dots and dashes used with any Morse letter is four, the number of code set-up switches required is 14 to take into account the two inter-letter spaces required in a three-letter group. The 14 outputs, 20a through 20n of translator 700 are fed via code set-up switches 10 to dash and space command lines 58 and 78. It is apparent that the number of code elements handled by the keyer system, 14 in the present case, can be expanded any quantity desired by increasing the binary counter chain, modifying the translator, and increasing the number of code set-up switches.

Figure 3:
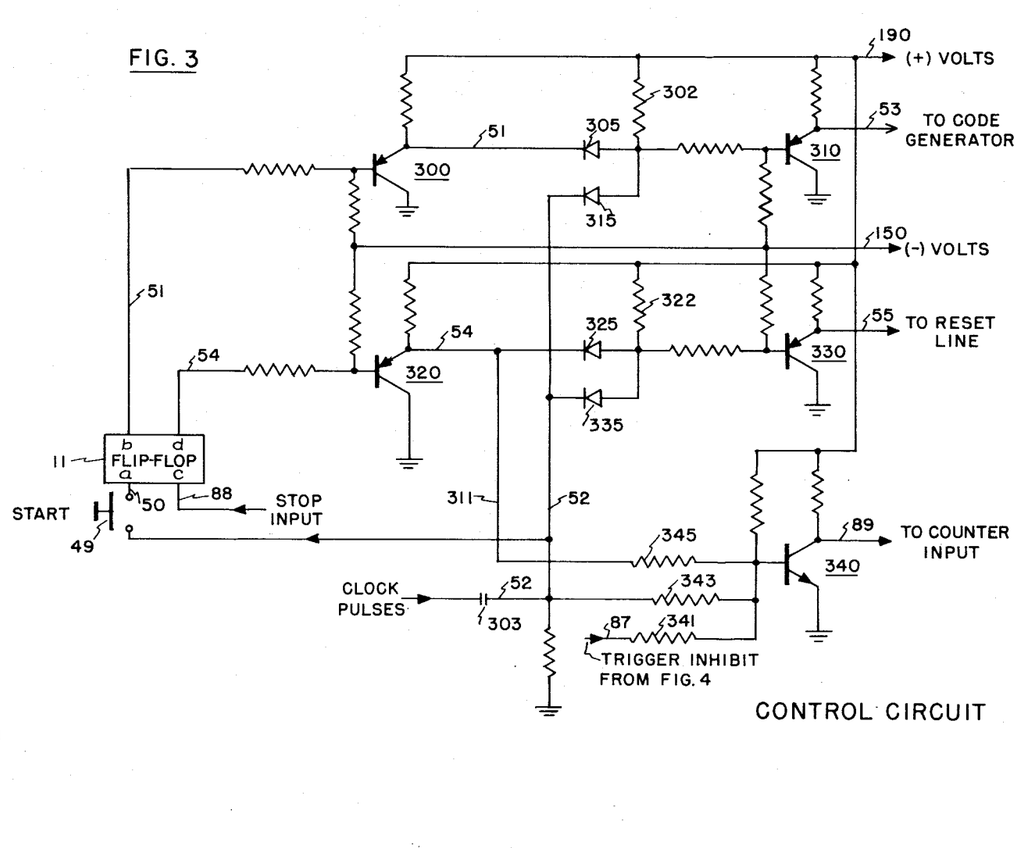
FIG. 3 is a schematic representation of an exemplary keyer control circuit.

The control circuit and code generator of FIGURE 6 remain to be described. FIGURE 3 illustrates, in detail, the control circuit that includes the functions of items 11, 12, 19, 22 and 33 of FIG. 1. The flip-flop, shown in block form in FIG. 3, is identical, in detailed circuitry, to FIG. 5.

The circuit of FIG. 3 employs PNP and NPN types of transistors utilizing bias supplies of both positive and negative polarity. Alternately positive and negative going clock pulses must be applied to the circuit at the terminal indicated. Capacitor 303 prevents D.C. levels existing on line 52 from short circuiting through the clock pulse generator.

Assume the signal keyer is inoperative, i.e., there is no code output being generated. In this case output *d* of the flip-flop is in the 1 or positive condition, causing the collector of translator 320 to be similarly positive. Transistor 320 is employed as a grounded, common-collector emitter-follower to isolate output *d* of the flip-flop from the attached load. With line 54 held positive by the collector of transistor 320, the "and" circuit comprised of diodes 325 and 335 and resistor 322 passes positive going clock pulses from line 52 via diode 335 to the base of transistor 330. Transistor 330 is also employed as an emitter follower and isolates the "and" circuit from the reset line load attached to line 55.

So long as these conditions maintain, clock pulses are fed from the control circuit via line 55 to the reset inputs of flip-flops 41, 51, 61, and 71 of FIG. 6. Due to the detailed circuit arrangement, output 20a of translator 700, FIG. 6, is maintained positive. This output condition is illustrated on line 20a of FIG. 2.

Resistor 345 receives, via line 311, the positive potential at the collector of transistor 320. As result, the base of NPN transistor 340 is carried to a positive potential such that the collector of transistor 340 is held near ground potential. Resistors 345 and 343 are selected in value such that the negative clock pulses, existing on line 52, arriving at the base of transistor 340 via 343, do not override the positive potential established by means of resistor 345. During the inoperative condition of the signal keyer, no pulses appear on line 89 which feeds the counter input (refer to FIG. 6).

While output *d* of the flip-flop used in the control circuit, FIG. 3, is positive, output *b* is close to zero or ground potential. Therefore, the collector of transistor 300 remains near ground and the "and" circuit composed of diodes 305 and 315 and resistor 302 does not pass positive-going clock pulses. Thus no pulses can appear on line 53 which connects to the code generator.

Closure of switch 49 permits a positive pulse from line 52 to "set" the flip-flop via terminal *a*; this positive pulse corresponds to the start pulse of line B, FIG. 2. Output *d* of the flip-flop in FIG. 3 falls to near zero potential while output *b* assumes a positive potential. Thus the "and" circuit (items 325, 335, 322) feeding transistor 330 no longer passes pulses, and pulses no longer appear on reset line 55.

The positive voltage on line 51 causes the collector of emitter follower transistor 300 to become positive and enable the "and" circuit composed of items 305, 315 and 302. Positive clock pulses therefore feed through the "and" circuit to the base of emitter follower transistor 310 and appear on the transistor collector and thence line 53. Line 53 carries the pulses to the code generator circuit (refer to FIG. 4 and FIG. 6).

With output d of the flip-flop near zero, line 54 is near zero potential. Therefore, the positive potential fed to the base of transistor 340 via resistor 345 no longer exists. As a result, the negative going clock pulses delivered to the base of grounded emitter transistor 340 cause the base to be carried negative at instants intermediate to the occurrence of positive pulses on line 53. The characteristic signal inversion property of the grounded emitter stage creates a positive going pulse at the collector of transistor 340 and thus on line 89. By the use of the alternately positive and negative clock pulses on line 52 it is possible to achieve the purpose of the delay means indicated as item 19 in FIG. 1.

A third input to the base of transistor 340 is provided by line 87 via resistor 341. A positive potential applied to line 87 will prevent the appearance of positive pulses on line 89 in the same manner that the positive potential applied via resistor 345 did so. The necessity for this pulse inhibiting action will be brought out in the discussion of the code element generator to follow.

Figure 4:
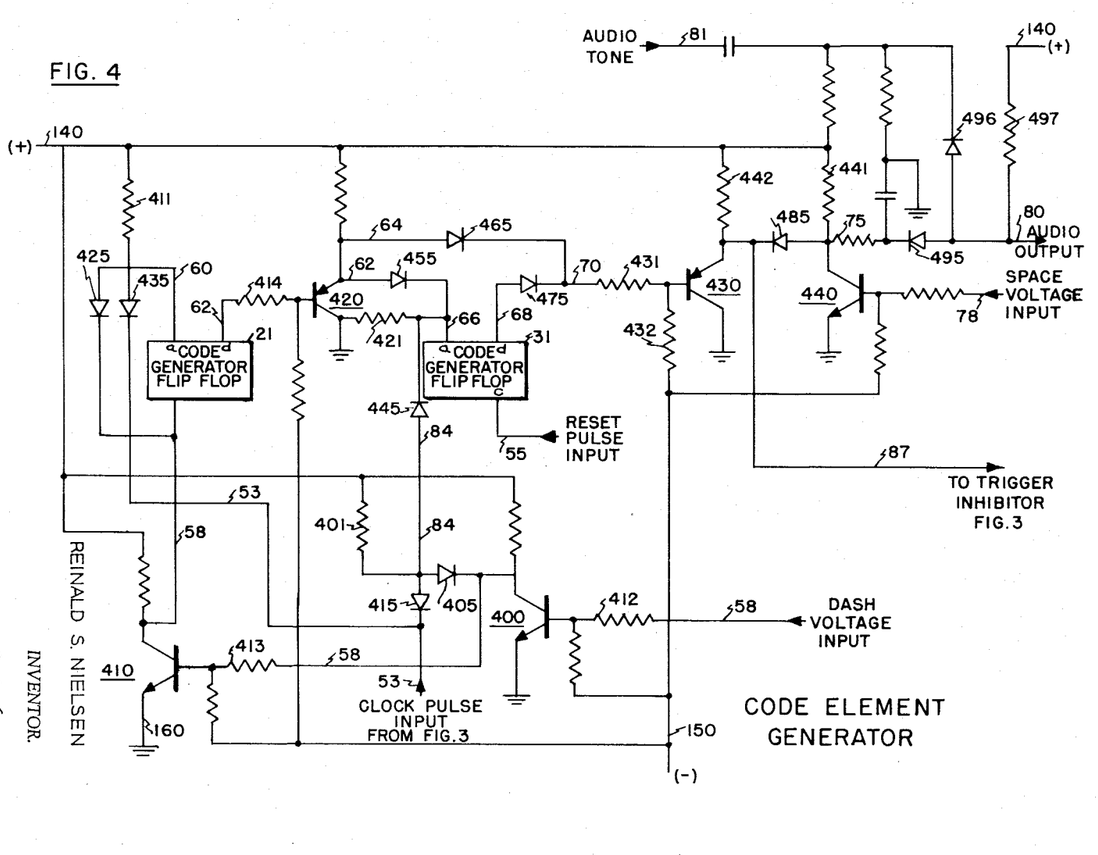
FIG. 4 is a schematic representation of an exemplary code element generator.

Details of the code element generator circuitry are shown in FIG. 4. Again, the flip-flops indicated in block form may be identical to those shown in FIG. 5. For discussion, we may assume that the code set-up switches have been set to produce the first letter B and that the action to be described is that following the action of the start pulse described above. Both NPN and PNP transistors and positive and negative bias potentials are also employed in the code element generator.

The initial dash of the letter B implies that the code set-up switches deliver the positive voltage existing on line 20a of FIG. 2 to the dash command line 58 of FIG. 1 and FIG. 4. Delivered to the base of grounded emitter transistor 400 via resistor 412, the positive potential on line 58 causes the collector of transistor 400 to fall near ground. As a result, the "and" circuit composed of items 405, 415 and 401 does not pass the positive clock pulses appearing on line 53. These pulses originate at the corresponding line 53 of FIG. 3.

In FIG. 4 again, the low potential at the collector of transistor 400, coupled via resistor 413, causes the base of grounded emitter stage 410 to go negative in potential. The collector of transistor 410 becomes positive and this potential is coupled via line 58 to code generator flip-flop 21, reset input c and diode 425 of the "and" circuit composed of items 425, 435, and 411. As a result, the positive pulses appearing on line 53 are passed by the "and" circuit to line 60 and thence to the input of binary connected flip-flop 21.

Items 425, 435, and 411 correspond to the "and" circuit designated as item 32 in FIGURE 1. The positive pulses passed by the "and" circuit, in the present instance, correspond to the first four pulses of line F, FIG. 2. Code generator flip-flop 21, of FIG. 4, responds to the input pulses on line 60 to create an output voltage at terminal d and line 62 such as is shown on line H of FIG. 2. Coupled through resistor 414, FIG. 4, the potential on line 62 is applied to the base of emitter follower transistor 420. The resultant potential at the collector of transistor 420 is coupled via diodes 455 and 465 to the input a of code generator flip-flop 31 and resistor 431.

Diode 455 forms one item of an "or" circuit (item 14 of FIG. 1) comprising diodes 445, 455, and resistor 421. The potential applied to line 66 via diode 455 results in a derived trigger pulse sequence as illustrated on line I in FIG. 2. Code generator flip-flop 31, in binary connection, reacts to these pulses to produce an output (at d in FIG. 4) as illustrated on line J of FIG. 2.

Diodes 465 and 475 with resistor 431, in FIG. 4, constitute an "or" circuit (item 24 of FIG. 1). Therefore, the voltages on line 64 (refer to line H, FIG. 2) and line 68 (refer to line J, FIG. 2) produce a voltage on line 70 as illustrated on line K of FIG. 2. The voltage on line 70, FIG. 4, is coupled via resistor 431 to the base of emitter follower transistor 430, and essentially appears at the collector of transistor 430. The positive voltage, during the interval of the dash, at the collector of transistor 430 is carried to the trigger pulse inhibitor input of FIG. 3 and of FIG. 6 via line 87.

The function of the trigger pulse inhibitor is to prevent the removal of the positive voltage appearing at the 20a translator output of FIG. 6 that is carried to the dash command input of the code element generator on line 58. Since the binary counter chain essentially establishes the output at 20a, the elimination (inhibition) of pulses to the counter chain input holds the positive output at 20a. This action is illustrated on lines M and 20a of FIG. 2. On line M are shown the input pulses to the counter chain, inhibited during the dash interval, while the 20a output of the translator is shown on line 20a. The trigger inhibit function described here corresponds to item 33 of FIG. 1.

When the fourth pulse has occurred at the input a of code generator flip-flop 21 (refer to line F, FIG. 2) of FIG. 4, the potential at the collector of transistor 430 has dropped to near zero potential (refer to line K, FIG. 2). Therefore the trigger inhibitor action no longer occurs and a pulse is delivered via line 89 from the control circuit, FIG. 3, to the counter chain. This pulse is illustrated on line M of FIG. 2 and the resultant change in translator output on lines 20a and 20b. Since the remaining three elements of the letter B are dots, there is no connection of translator output 20b to the code element generator.

Returning to FIG. 4, dash command line 58 is near zero potential, with the result that the base of transistor 400 is carried negative via resistor 412. Transistor 400 collector assumes a positive potential under these conditions, and the "and" circuit (items 405, 415, 401) is enabled. With transistor 400 collector positive, the base of transistor 410 is carried positive via resistor 413 and transistor 410 collector falls to near ground potential; the "and" circuit composed of items 425, 435 and 411 does not pass positive pulses.

The item 405, 415, 401 "and" circuit passes positive pulses via diode 445 to line 66 connected to input a of code generator flip-flop 31. (Items 405, 415, and 401 with transistor 400 correspond to item 23 of FIG. 1.) Diode 445 was mentioned above as part of an "or" circuit; it corresponds to a portion of item 14 of FIG. 1. The pulses passed by diodes 445 and 455 (parts of item 14) are illustrated on line I of FIG. 2.

Code generator flip-flop 31 of FIG. 4 responds to the the pulses on line 66 by producing an output at terminal d as illustrated on line J of FIG. 2. Coupled via diode 475 and resistor 431, FIG. 4, a similar voltage appears at the base and thence at the collector of transistor 430.

The action above described in the formation of a dot interval continues through the remaining two dot elements of the letter B. To provide the required interletter space between the B and a succeeding letter, the code set-up switches have been set to feed the 20e output of translator 700, FIG. 6, to the space command line 78 of FIG. 6 and FIG. 4. Since the space command voltage does not affect the circuits corresponding to items 23 and 32 of FIG. 1, a dot element is generated as before. This is illustrated as the fourth dot interval on line K of FIG. 2. The voltage shown on line K FIG. 2 corresponds to that occurring at the collector of transistor 430, FIG. 4.

The voltage at the collector of transistor 430 is coupled via diode 485 to the collector of transistor 440. When the space command voltage is present on line 78 and thence at the base of grounded emitter transistor 440, the collector of transistor 440 is held near ground potential. Therefore the positive potential corresponding to a dot, occurring during the space interval, does not appear at the collector of transistor 440 or line 75. Transistor 440 with diode 485 corresponds to items 13 of FIG. 1. Thus, at the collector of transistor 440, line 75, of FIG. 4, a voltage waveform is created that is analogous to the dot, dash, and space intervals of a Morse code letter symbol.

Items 495, 496 and 497 of FIG. 4 correspond to item 42 of FIG. 1. The voltage waveform appearing at transistor 440 collector, FIG. 4, is coupled via a "click" suppressing RC network to diode 495; and audio frequency signal applied to line 81 is coupled to the cathode terminal of diode 496 which is held at a positive potential in respect to ground by a resistor network. Therefore, during each interval that transistor 440 collector is positive, an audio frequency signal appears on line 80, the audio output line.

It was mentioned above that the voltage appearing at the collector of transistor 410 is coupled to the reset input c of flip-flop 21; similarly, the reset pulses appearing on line 55 in FIG. 3 are carried to reset input c of code generator flip-flop 31 in FIG. 4. These reset inputs are intended to assure that the code generator flip-flops always start from the correct state at the start of each code element and code sequence.

The above descibed circuits are representative only of a preferred means by which the principle of the signal keyer may be implemented. It would be obvious to one skilled in the art that vacuum tubes, magnetic core elements, non-linear dielectric elements, and the like could be used to provide the functions of the flip-flops, the "and" circuits, the "or" circuits, and the other logic circuits. With the fundamental dot interval defined by the clock pulse period, it is apparent that relatively straightforward modifications of the code set-up switches would permit controlling the clock pulse frequency, in terms of the number and type of code elements, to cause all three letter combinations to be generated in a given length of time. Such modifications of the signal keyer would be useful in low frequency aircraft radio range operation when radio station identification signals must extend over a fixed time interval. The use of the settings of letter selection switches to determine a "weight" for a given letter so as to control dot and dash time durations is shown in U.S. Patent 2,771,600 to Wright et al. It will be obvious at this point to those skilled in the art, that a control signal may be derived in accordance with the settings of selector switches 20a, 20b, 20c, to control the frequency of clock pulse generator 15.

It will thus be seen that the objects set forth above, among those made apparent from the preceding description, are efficiently attained and, since certain changes may be made in the above article without departing from the scope of the invention, it is intended that all matter contained in the above description shall be interpreted as illustrative and not in a limiting sense.

Having described my invention, what I claim as new and desire to secure by Letters Patent is:

1. An automatic signal keyer for generating code messages composed of dot, dash, and space elements comprising,
 (a) a plurality of settable means each including an individual output terminal for each of said dot, dash, and space elements and an input terminal;
 (b) a source of pulses spaced in accordance with the duration of a dot element;
 (c) interrogating means connected to said input terminals for successively energizing the output terminal to which each of said settable means is set for providing control signals in accordance therewith; and
 (d) a first group of serially connected logic circuits responsive to said source of pulses and the energized ones of said dot output terminals of said settable means for generating said dot elements, a second group of serially connected logic circuits including a portion of said first group responsive to said source of pulses and the energized ones of said dash output terminals of said settable means for generating said dash elements to provide further signals effective to the energized ones of said space output terminals to prevent the generation of said dot and dash elements.

2. An automatic signal keyer for generating code messages composed of dot, dash, and space elements comprising,
 (a) a plurality of settable means each including an input terminal and an output terminal for each of said dot, dash, and space elements, respectively;
 (b) a source of timing pulses spaced in accordance with the duration of a dot element;
 (c) interrogating means for successively energizing the set output terminal of each of said settable means for selectively providing dot, dash and space element control signals in accordance therewith;
 (d) a first group of logical circuits for combining said timing pulses and control signals representative of dash elements to provide further signals effective to generate said dash elements;
 (e) a second group of logical circuits, including a portion of said first group, for combining said timing pulses and control signals representative of dot elements to provide other signals effective to generate said dot elements;
 (f) a third group of logical circuits connected to the output of said first and second groups of logical circuits; signal means, a coded output terminal, and circuit means coupling said signal means to said coded output terminal only during time intervals when said first and second groups of logical circuits are combining said respective control signals and said timing pulses; and
 (g) circuit means connected between said third group of logical circuits and said control signals representative of said space element for inhibiting said circuit means.

3. An automatic Morse code keyer for providing a predetermined sequence of dot, dash, and space signals comprising,
 (a) a plurality of settable means selectably operable to indicate said predetermined sequence of dot, dash, and space signals;
 (b) a plurality of logical circuits including first and second serially connected bistable circuits and circuit means for summing the outputs of said first and second bistable circuits in parallel;
 (c) an oscillator and an output means;
 (d) first control means connected to the output of said circuit means for coupling said oscillator to said output means;
 (e) a sequence of clock pulses the spacing of which is equal to the duration of each of said dot signals:
 (f) interrogating means for successively determining the signal indicated by each of said settable means and for providing control signals in accordance therewith;
 (g) said control signal indicative of a dot signal coupling said clock pulses to the input of said second bistable circuit, said control signal indicative of a dash signal coupling said clock pulses to the input of said first bistable circuit, and said control signals indicative of a space signal coupled to said first control means for inhibiting the same; and
 (h) second control means responsive to said circuit means for advancing said interrogating means to interrogate the next successive settable means.

4. In an automatic electronic keyer provided with an encoder for storing characters of letters in a call letter sequence, apparatus for generating Morse code keying signals comprising;
 (a) means for generating and transmitting a train of pulses;

(b) means for systematically searching said encoder for encoded dots, dashes, and long spaces;

(c) means cooperating with said pulses for producing, upon finding in said encoder a required dot, a dot pulse and a short space pulse, and upon finding in said encoder a required dash, a pair of dot pulses separated by a short space pulse;

(d) further means cooperating with said pulses for producing, upon finding in said encoder a required dash, a dot bridging pulse, and upon finding in said encoder a required long space, a short space bridging pulse;

(e) and means for bridging two consecutive dot pulses with a dot bridging pulse and two consecutive short space pulses with a short space bridging pulse thereby to effect ultimate transmission of dots, dashes and short and long spaces.

5. An automatic signal keyer for generating code messages composed of dot, dash, and space elements comprising, a plurality of multi-position switches each selectively positionable to connect an input terminal to one of a plurality of output terminals, a first of said plurality of output terminals representing a dot element, a second of said plurality of output terminals representing a dash element, and a third of said plurality of output terminals representing a space element;

interrogating means coupled to the input of said switches for successively energizing the output terminal selected by the position of all of said multi-position switches;

first and second bistable devices;

first circuit means connecting the output of said first bistable device to the input of said second bistable device;

a source of pulses for providing a sequence of pulse signals spaced in accordance with time interval assigned to a dot element;

second circuit means connecting said source to the input of said second bistable device when said interrogating means energizes any of said first of said plurality of output terminals of said plurality of multi-position switches, and connecting said source to the input of said first bistable device when said interrogating means energizes any of said second of said plurality of output terminals of said multi-position switches;

means combining the outputs of said first and second bistable devices; and means inhibiting the combined output of both of said first and second devices when said interrogating means energizes any of said third of said plurality of output terminals of said multi-position switches.

6. An automatic signal keyer for generating code messages composed of dot, dash, and space elements comprising, a plurality of settable means each positionable to encode at a set of output terminals a selected sequence of said dot, dash and space elements;

a source of equally spaced apart pulses;

a first logical circuit path including a NOT AND circuit, first OR circuit, a first flip flop circuit, and a second OR circuit, and first circuit means connecting said circuits electrically in series in the order given;

a second logical circuit path including an AND circuit and a second flip flop, and second circuit means connecting said circuits electrically in series in the order given, and the output of said second flip flop to an input of each of said first and second OR circuits;

means connecting said source to an input of said NOT AND and AND circuits in parallel;

a sequence counter coupled to said plurality of settable means for successively energizing said set of output terminals; and third circuit means connecting all of said dot encoded terminals to the control input of said NOT AND circuit and connecting all of said dash encoded terminals to another input of said AND circuit.

7. The signal keyer of claim 6 including a tone generator, a gate circuit, and a coded tone output terminal;

a second NOT AND circuit;

fourth circuit means connecting said tone generator, said gate circuit, and said coded tone output terminal electrically in series; and fifth circuit means coupling the output of said second OR circuit through said second NOT AND circuit to the control input of said gate circuit.

8. The signal keyer of claim 7 further including sixth circuit means connecting said energized space encoded terminals to the control input of said second NOT AND circuit.

9. The signal keyer of claim 6 wherein said plurality of settable means are additionally selectively positionable to inhibit said means connecting said source to an input of said NOT AND and AND circuits in parallel.

10. In an automatic signal keyer for generating Morse code messages composed of dot, dash, and space signals including a plurality of switch means selectively settable to one of a dot, dash, or space signal representing position: improved circuitry for ensuring that the duration of a dash signal is three times the duration of a dot signal comprising, first and second bistable switching devices each having an input terminal and an output terminal;

means connecting the output terminal of said first device to said input terminal of said second device;

a source of evenly spaced apart clock pulses;

interrogation means for successively determining the position of each said plurality of switch means;

first circuit means responsive to said interrogation means to couple said source to said input terminal of said second device when any of said plurality of switch means is in a dot representing position to change the state thereof;

second circuit means responsive to said interrogation means to couple said source to said input terminal of said first device when any of said plurality of switch means is in a dash representing position, to change the state thereof, the change of state thereof further effective through said connecting means to control the state of said second device; and third circuit means connecting said output terminals of said first and second bistable devices in parallel to an output terminal, said output terminal providing said dot and dash signals.

References Cited by the Examiner

UNITED STATES PATENTS

| | | | |
|---|---|---|---|
| 2,409,229 | 10/46 | Smith et al. | 340—348 |
| 2,567,944 | 9/51 | Krause et al. | 340—345 |
| 2,612,562 | 9/52 | Baker | 178—17 |
| 3,021,516 | 2/62 | Spitz et al. | 340—345 |

NEIL C. READ, *Primary Examiner.*